United States Patent
Brinke-Seiferth

(10) Patent No.: US 11,027,238 B2
(45) Date of Patent: Jun. 8, 2021

(54) METHOD FOR SEPARATING CHARGED BIOLOGICALLY ACTIVE SUBSTANCES FROM LIQUIDS AND THE RECOVERY THEREOF

(71) Applicant: i3 MEMBRANE GMBH, Hamburg (DE)

(72) Inventor: Stephan Brinke-Seiferth, Hamburg (DE)

(73) Assignee: i3 Membrane GmbH

(*) Notice: Subject to any disclaimer, the term of this patent is extended or adjusted under 35 U.S.C. 154(b) by 49 days.

(21) Appl. No.: 16/473,640

(22) PCT Filed: Dec. 28, 2017

(86) PCT No.: PCT/EP2017/084721
§ 371 (c)(1),
(2) Date: Jun. 26, 2019

(87) PCT Pub. No.: WO2018/122315
PCT Pub. Date: Jul. 5, 2018

(65) Prior Publication Data
US 2019/0344220 A1    Nov. 14, 2019

(30) Foreign Application Priority Data

Dec. 28, 2016  (DE) .......................... 102016125818.0

(51) Int. Cl.
*B01D 61/42*    (2006.01)
*B01D 65/02*    (2006.01)
(Continued)

(52) U.S. Cl.
CPC ........... *B01D 61/425* (2013.01); *B01D 65/02* (2013.01); *B01D 67/0088* (2013.01);
(Continued)

(58) Field of Classification Search
CPC .. B01D 61/425; B01D 65/02; B01D 67/0088; B01D 69/12; B01D 71/68;
(Continued)

(56) References Cited

U.S. PATENT DOCUMENTS 4,720,400 A    1/1988 Manniso
4,857,080 A    8/1989 Baker et al.
(Continued)

FOREIGN PATENT DOCUMENTS

CH    678403    9/1991
CN    1172774 A    2/1998
(Continued)

OTHER PUBLICATIONS

"Separation Processes Based on Electrosorption Phenomena", George Grevillot, A. E. Rodrigues et al. (eds.), Adsorption: Science and Technology, 193-221.
(Continued)

*Primary Examiner* — Arun S Phasge
(74) *Attorney, Agent, or Firm* — Sand, Sebolt & Wernow Co., LPA

(57) ABSTRACT

The present invention relates to a method for the at least temporary retention of charged biologically active substances such as endotoxins, viruses, and proteins from liquids, and optional later release for better determination. The object is achieved by a method for the at least temporary separation and/or detection of charged biologically active substances in a liquid by means of electrosorption and/or electrofiltration, comprising the following steps: a. providing a polymer membrane with a flat and porous metal coating at least on a first side of the polymer membrane; b. providing a counterelectrode; c. applying a voltage between the metal coating of the polymer membrane and the counterelectrode; d. bringing the polymer membrane and the
(Continued)

counterelectrode into contact with the liquid, with the contacting being performed such that the liquid generates at least one connection between the polymer membrane and the counterelectrode.

25 Claims, 3 Drawing Sheets

(51) Int. Cl.
  *B01D 67/00* (2006.01)
  *B01D 69/12* (2006.01)
  *B01D 71/68* (2006.01)
  *G01N 27/447* (2006.01)
(52) U.S. Cl.
  CPC .............. *B01D 69/12* (2013.01); *B01D 71/68* (2013.01); *G01N 27/44756* (2013.01); *B01D 2313/24* (2013.01); *B01D 2313/345* (2013.01)
(58) Field of Classification Search
  CPC .......... B01D 2313/24; B01D 2313/345; B01D 2311/2684; G01N 27/44756
  See application file for complete search history.

(56) References Cited

U.S. PATENT DOCUMENTS

| | | | |
|---|---|---|---|
| 5,282,971 | A | 2/1994 | Degan et al. |
| 7,132,049 | B2 | 11/2006 | Hou et al. |
| 7,396,465 | B2 | 7/2008 | Wu et al. |
| 10,682,612 | B2 * | 6/2020 | Brinke-Seiferth |
| 2013/0240361 | A1 * | 9/2013 | Simonis |
| 2014/0076728 | A1 | 3/2014 | Prakash et al. |
| 2016/0166960 | A1 | 6/2016 | Choi et al. |

FOREIGN PATENT DOCUMENTS

| | | |
|---|---|---|
| CN | 1780793 A | 5/2006 |
| CN | 101232931 | 8/2006 |
| CN | 102423645 A | 4/2012 |
| CN | 102773026 A | 11/2012 |
| CN | 104211138 A | 12/2014 |
| DE | 19810947 | 3/1998 |
| DE | 19810947 | 9/1999 |
| DE | 10013457 | 9/2001 |
| DE | 10164214 | 7/2003 |
| DE | 102011012832 | 4/2012 |
| EP | 0380266 | 8/1990 |
| EP | 0860888 A | 8/1998 |
| EP | 0872278 | 10/1998 |
| EP | 2087916 | 8/2009 |
| EP | 3115099 | 1/2017 |
| WO | 99/22843 | 5/1999 |
| WO | 1999/022843 | 5/1999 |
| WO | 2002051874 | 7/2002 |
| WO | 2004096715 A | 11/2004 |
| WO | 2011057341 | 5/2011 |

OTHER PUBLICATIONS

"Analyte Loss Due to Membrane Filter Adsorption as Determined by High-Performance Liquid Chromatography". M. Carlson and R.D. Thompson, Journal of Chromatographic Science, vol. 38, Feb. 2000.
"Removal of Arsenic and Humic Substances (HSs) by Electro-Ultrafiltration (EUF)." Weng, Y.H. et all, Journal of Hazardous Materials B122 (2005), pp. 171-176.
Spietelun Agata et al: "Recent developments and future trends in solid phase microextration techniques towards green analytical chemistry", Journal of Chromatography A, vol. 1321, Oct. 17, 2013 (Oct. 17, 2013), pp. 1-13, XP028785488, ISSN: 0021-9673, SOI: 10.2016/J. Chroma. 2013.10.030 p. 5, right-hand column, last paragraph—p. 6, right-hand column, paragraph 1.
Loh I-H et al: "Electrically Conductive Membranes: Synthesis and Applications", Journal of Membrane Science, Elsevier BV, NL, vol. 50, No. 1, May 1, 1990 (May 1, 1990), pp. 31-49, XP000159695, ISSN: 0376-7388, DOI: 10.2016/S0376-7388(00)80884-4 the whole document.
Analyte Loss Due to Membrane Filter Adsoption As Determined by High-Performance Liquid Chomatography; M. Carlson and R.D. Thompson; Journal of Chromatographic Science, vol. 38, Feb. 2000.
Removal of Arsenic and Humic Substances (HSs) by Electro-Ultrafiltration (EUF); Weng, Y.-H. et al., Chem Eng. R&D, vol. 77, Jul. 1999, pp. 461-468.

* cited by examiner

METHOD FOR SEPARATING CHARGED BIOLOGICALLY ACTIVE SUBSTANCES FROM LIQUIDS AND THE RECOVERY THEREOF

TECHNICAL FIELD

The present invention relates to a method for the at least temporary retention of charged biologically active substances such as endotoxins, viruses, and proteins from liquids, and optional later release for better determination.

BACKGROUND

Background Information

Endotoxins are lipopolysaccharides (LPS) and components of the outer membrane of the cell wall of Gram-negative bacteria. They consist of a lipophilic lipid that is anchored in the membrane and a hydrophilic polysaccharide, which represents the antigenic properties. Endotoxins are released upon lysis of the bacterial cell. They are extremely heat-stable and can even be detected after sterilization—that is, after the bacteria have been killed. Because of their ability to induce an immune response, endotoxins are among the pyrogens. Endotoxins in a quantity of 1 ng/kg body weight are considered sufficient to cause a febrile response (ARDUINO (1989)). Besides fever as a result of inflammation, they can cause numerous physiological reactions in humans after contact with mucous membranes and especially upon passing into the bloodstream. These include hypotension, blood coagulation, and complement activation, as well as life-threatening states of shock.

Endotoxins are usually detected in rabbits or by means of a Limulus amebocyte lysate (LAL) test. The LAL test is based on the blood of the horseshoe crab, which reacts extremely sensitively to endotoxins of Gram-negative bacteria. Due to its sensitivity, the LAL test is the most widely used test in the fields of pharmacology and medicine. However, endotoxins can only be determined in clear, undyed fluids when using this test. Direct determination of endotoxins in human blood is therefore not possible. It is for this reason that the so-called monocyte activation test was developed in recent years. This works by using different levels of enzymatic reactions that mimic the human fever response. It also requires the creation of a standard curve for each determination, since the reactants of each test kit react differently. This test requires special training, has high specific costs, and also takes much longer than the LAL test.

Microporous membranes have long since been known. These are made primarily of polymers and used for water treatment (wastewater, drinking water, industrial waters) as well as in the pharmaceutical industry for the production of ultrapure water and in medical technology as sterile filters or respiratory filters. The areas of application are numerous and very divergent. Microporous membranes typically have a pore size between 0.01 µm and 10 µm and retain substances according to these pore sizes.

Microporous filters are typically used to separate substances that are dissolved in water and to obtain a clear filtrate. This is generally done mechanically through the pore size. All substances that are larger than the size of the pores are mechanically retained. In addition to this property, there is another mechanism that takes place in order to retain substances when they pass through the membrane. This is an undefined adsorption by the materials making up the membrane itself, such as polyether sulfone, polypropylene, or polyvinylidene fluoride (PVDF), for example. Different materials adsorb different solutes to different degrees ("Analyte loss due to membrane filter adsorption as determined by high-performance liquid chromatography," M. Carlson and R. D. Thompson, Journal of Chromatographic Science, Vol. 38, February 2000).

Targeted adsorption of substances smaller than the pore size of the microporous membrane by means of the material properties of the membrane material is achieved through treatment of the chemical composition of the membrane material. A positive charge is generated, for example, by combining the membrane material with positively charged quaternary ammonium compounds. Positively charged membranes are known from U.S. Pat. No. 5,282,971 or from U.S. Pat. No. 7,396,465 B2, while negatively charged membranes are known from U.S. Pat. No. 7,132,049 B2. For example, positively charged microporous membranes are used to mechanically retain bacteria and allow positively charged material to pass through in order to avoid nontargeted, unquantifiable adsorption by the membrane material. However, positively and negatively charged membranes are also used to bind and concentrate proteins by adsorption. Positively charged microporous membranes are also used to bind endotoxins and viruses through adsorption in addition to filtration, as is disclosed in DE 1999981099947 A1, for example.

CH 678403 discloses a metal-coated membrane with optionally slightly porous passages between macropores on one side and micropores on the metallic side. In addition, metal membranes with tunnel-like passages are known from DE 101 64 214 A1, for example. These differ from passages that are porous in the parlance of the application, such as those which are known from porous polymer membranes, for example, in that they form no cavities outside of the actual passage channel within the membrane. Therefore, "porous" is not to be equated with the characterization that the membrane has pores, i.e., passages, like in DE 101 64 214 A1, for example. Porous passages thus have a surface area within the membrane that substantially exceeds the surface area of a circular tunnel with the same pore size through a membrane of equal thickness, at least by 50%, particularly by a multiple, more particularly by at least threefold.

Moreover, it is known from WO 1999/22843 A1 to sputter a polymer membrane with metal.

It is also known from U.S. Pat. No. 4,857,080 to seal a membrane with a metal coating.

Another form of adsorption is electrosorption. Electrosorption is accomplished by forming an electrically charged field on surfaces by applying a positive and negative voltage to two electrodes. A combination of electrosorption and ultraporous filtration is described in "Removal of arsenic and humic substances (HSs) by electro-ultrafiltration (EUF)" (Weng, Y.-H. et al., Chem. Eng. R&D Vol. 77, July 1999, pages 461-468). In that case, an increase of 30% to 90% in the adsorption of negatively charged arsenic (V) during the filtration of arsenic-contaminated water is achieved by ultrafiltration by establishing an electric field by means of an external electrode that is positioned near an ultrafiltration membrane. A similar use of electrosorption in combination with membranes is described in US 2013/0240361 A1. The purification of dialysis water is described in a combination of substances with highly adsorptive properties and the regeneration thereof by electrical charging. The method is carried out in conjunction with a dialysis membrane filter.

An electrosorption membrane is described in EP 0872278 A1. Here, a ceramic membrane is provided with a conductive layer of pyrolytic carbon. The pores are sealed with pyrolytic carbon, and the ceramic surface is then rendered conductive through high-temperature conversion of the ceramic surface to carbide. With this ceramic membrane, salts were adsorptively bound on the surface by electrosorption. Possible electrosorption on the conductive surface of a ceramic membrane allows for a more flexible sorption of substances but is very expensive to achieve. The pores of the membrane are sealed during the process for producing the conductive surface, and the ceramic surface is provided with a conductive carbide layer in a subsequent production step by means of very high temperatures.

In addition to the advantages of membranes that have been positively or negatively charged by chemical treatment—namely the combination of mechanical filtration and adsorption—they also have a drawback. Since the charge cannot be varied, the substances that have been adsorptively bound can be removed again or recovered once the membrane has been loaded only by shifting the charge through a solution to be filtered, generally by means of a change in pH. In particular, this represents an additional expense during the recovery of active substances such as proteins through concentration. Endotoxins are denatured by shifting the pH into the basic range. But this pH shift would be necessary in order to recover endotoxins from a positively charged membrane. It is therefore not possible to obtain endotoxins—from blood, for example—by means of permanently charged membranes in order to subsequently convert them into a colorless liquid and forward them for easier analysis.

SUMMARY

The object is to establish a method for the at least temporary separation and/or detection of charged biologically active substances, particularly endotoxins, from liquids, particularly from colored liquids.

The object is also to establish a method for the at least temporary retention of charged biologically active substances, particularly endotoxins, in order, for example, to enable the content of endotoxins to be determined independently of the other substances of the original fluid.

It is also the object to provide a corresponding device.

The objects are achieved by a method for the at least temporary separation and/or detection of charged biologically active substances in a liquid by means of electrosorption and/or electrofiltration, comprising the steps of a. providing a polymer membrane with a flat and porous metal coating at least on a first side of the polymer membrane; b. providing a counterelectrode; c. applying a voltage between the metal coating of the polymer membrane and the counterelectrode; and d. bringing the polymer membrane and the counterelectrode into contact with the liquid, with the contacting being performed such that the liquid generates at least one connection between the polymer membrane and the counterelectrode. The objects are further achieved by an electrofiltration and/or electrosorption device comprising at least one polymer membrane with a flat and porous metal coating on at least one side of the polymer membrane and a contact of the metal coating and a counterelectrode and, in particular, an additional electrode, wherein the polymer membrane and the counterelectrode are arranged in a housing that is embodied particularly as a syringe attachment and/or has a small hold-up volume, particularly of no more than 10 ml and/or no more than 20 $mm^3/mm^2$ of metal coating on the polymer membrane, particularly no more than 2 $mm^3/mm^2$ of metal coating on the polymer membrane, and/or wherein the polymer membrane and the counterelectrode are connected to a voltage source that is configured to form a voltage between polymer membrane and counterelectrode, wherein the voltage source with the polymer membrane and the counterelectrode are arranged particularly in a common housing, and/or a current-measuring device is provided that measures the current flowing between polymer membrane and counterelectrode and/or the rate of change thereof and/or compares it with a limit value, and/or the voltage source is configured to reverse and/or reduce the polarity of the voltage.

Advantageous developments include a method wherein step c takes place after steps a and b and before step d, and/or wherein step d takes place after steps a and b and before step c. Further advantageous developments include a method wherein, after steps a to d, the liquid is removed at least partially and/or the liquid is allowed to pass through the membrane at least partially. The method may further include that after steps a to d, a polarity reversal and/or reduction of the voltage takes place, with rinsing of the membrane being performed particularly before and/or after the polarity reversal and/or reduction. The polymer membrane with a flat and porous metal coating and the counterelectrode are accommodated in a housing, which, in particular, has a small hold-up volume, particularly of no more than 10 ml and/or no more than 20 $mm^3/mm^2$ of metal coating on the polymer membrane, particularly no more than 2 $mm^3/mm^2$ of metal coating on the polymer membrane, and the liquid to be filtered is conducted through the housing. In the method, the liquid is pressed out of a syringe against the polymer membrane with a flat and porous metal coating or through the polymer membrane with a flat and porous metal coating and/or through the housing through actuation of the syringe. The counterelectrode is formed either by an additional flat, porous metal coating on a second side that is situated opposite the first side, the two-dimensional metal coatings being isolated from each other by the polymer membrane, or through arrangement of a permeable electrode that is formed particularly by a metallic mesh with interposition of an insulating and permeable spacer. The method is characterized in that the porosity of the polymer membrane with metal coating is reduced by between 1% and 50%, in particular 1 and 20% relative to the initial bubble point pore and/or the mean pore size compared to the uncoated polymer membrane. The method is further characterized in that the thickness of the metal coating is from 5 to 50 nm and the pore size of the uncoated polymer membrane is particularly greater than 0.01 µm. The method is used for determining the occupancy of the binding sites of the polymer membrane with a flat and porous metal coating and/or for determining at least one concentration in the liquid, wherein the current flow caused by the applied voltage is detected and/or evaluated, particularly evaluated with regard to falling below a limit and/or exceeding a positive and/negative rate of change, and an alarm is triggered particularly in the case of an undershoot or overshoot.

Further advantageous developments in the electrosorption and/or electrofiltration device include that the counterelectrode is either formed by an additional flat, porous metal coating on a second side that is situated opposite the first side or by a permeable electrode that is formed particularly by a metallic mesh with interposition of an insulating and permeable spacer. In the electrosorption and/or electrofiltration device, the porosity of the polymer membrane with metal coating is reduced by between 1% and 50%, in particular 1 and 20% relative to the initial bubble point pore and/or the mean pore size compared to the uncoated polymer membrane. Furthermore, in the electrosorption and/or electrofiltration device, the thickness of the metal coating is from 5 to 50 nm and the pore size of the uncoated polymer membrane is particularly from 0.01 µm to 15 µm.

The production of a polymer membrane with a flat and porous metal coating for use in the method and/or the device can be achieved through deposition by means of magnetron sputtering. This allows for the large-scale production of thin layers with a homogeneous layer thickness as well as a complex layered structure. The basis of the magnetron deposition is a plasma discharge in an inert gas atmosphere, e.g., argon, that is amplified by a static magnetic field (A. Anders, Handbook of Plasma Immersion Ion Implantation and Deposition, Wiley-VHC, 2004). The ions of the process gas are accelerated cathode, knocking atoms out of the cathode on impact. Consequently, the cathode (target) must be made of the material that is to be deposited. The atoms knocked out of the target then condense on the substrate to be coated and form a continuous thin layer. This layer thickness can be produced in a controlled manner so as to be from few nanometers to several micrometers. Besides round magnetrons, rectangular variants that are several meters in length are widely used above all for coating large surfaces, for example in architectural glass coating. Surfaces of membranes can be coated in this way.

In order to produce the polymer membrane with a flat and porous metal coating, a polymer membrane (for example, polysulfone, polyethersulfone, polypropylene, or polyvinylidene fluoride) can be provided with a thin layer of metal by means of the magnetron sputtering process. The residence time of the membrane in the process is selected so as to be short enough that the temperature remains below 200° C., particularly below 100° C., and the original chemical structure of the polymer membrane is not affected. As an example, a polyethersulfone membrane having a microporous structure was provided with a 20 nm-thin layer of aluminum. Porosity analyses were performed on this membrane. The following table shows the results of the porosity measurement of the membrane in the original state on the one hand and with a layer of aluminum with a defined thickness of 20 nm on the other hand.

TABLE 1

Pore size of a microporous polyethersulfone membrane in the original and with a 20 nm-thick layer of aluminum.

| | Polyethersulfone membrane | | Difference |
|---|---|---|---|
| | 20 nm coating Al | Original | % |
| Bubble point pore size (µm) | 0.51 | 0.56 | 8.5 |
| Mean pore size (µm) | 0.41 | 0.43 | 6.1 |
| Smallest pore size (µm) | 0.37 | 0.39 | 5.5 |

It can be seen that the porosity of the membrane is influenced to below 10%.

The metal coating is applied at least two-dimensionally to a first side of the polymer membrane and/or at least to the surfaces that can be accessed from one side, particularly until the layer thickness of the metal coating of the polymer membrane is between 1% and 45% relative to the initial bubble point pore and/or the mean pore size of the uncoated polymer membrane.

Particularly with a preferred coating up to a thickness of up to 200 nm, it is possible to hardly influence the pore size of the polymer membrane, in particular the polysulfone membrane, particularly in the range from 0.1 µm to 10 µm, and to thus leave it largely unchanged.

The coating is particularly porous and, in particular, applied directly.

Copper, aluminum, silver, gold, nickel, platinum, and/or tungsten or alloys containing copper, aluminum, silver, gold, nickel, platinum, and/or tungsten can be used as the metal for the coating.

Membranes of polysulfone, polypropylene, polyethersulfone, polyetherimide, polyacrylonitrile, polycarbonate, polyethylene terephthalate, polyvinylidene fluoride (PVDF), and/or polytetrafluoroethylene or membranes containing polysulfone, polypropylene, polyethersulfone, polyetherimide, polyacrylonitrile, cellulose, polycarbonate, polyethylene terephthalate, polyvinylidene fluoride (PVDF), and/or polytetrafluoroethylene can be used as the polymer membrane, for example.

It is with particular advantage that metal is deposited until the layer thickness of the metal coating of the polymer membrane is between 1% and 45% relative to the initial bubble point pore and/or the mean pore size of the uncoated polymer membrane.

These values enable good conductivity to be combined with good throughput and high porosity.

Preferably, metal is deposited until the porosity of the polymer membrane with metal coating is reduced by between 1% and 50%, in particular 1 and 20% relative to the initial bubble point pore and/or the mean pore size compared to the uncoated polymer membrane. These values also enable good conductivity to be combined with good throughput and high porosity.

Preferably, metal is deposited until the initial bubble point pore and/or the mean pore size of the polymer membrane with metal coating and/or aluminum oxide is 0.01 to 10 µm. For this purpose, the polymer membrane is selected so as to have an initial bubble point pore and/or mean pore size of greater than 0.01 to 10 µm.

Advantageously, the polymer membrane is coated on the first side and on a second side that is situated opposite the first side porously and directly with metal. In particular, the two-dimensional coatings, including metallizations, are electrically insulated from one another.

Through omission of the coating of the porous passages and of the edges to the extent that no conductive connection is formed between the two sides, a membrane with two electrically conductive and mutually insulated surfaces can be produced.

Advantageously, metal has been deposited until the thickness of the metal coating or the mean thickness of the metal coating is at least 1 nm, particularly at least 5 nm, and no more than 50 nm. These values of at least 5 nm enable good conductivity to be combined with good throughput and high porosity.

Advantageously, the pore size of the uncoated polymer membrane is selected so as to be between 0.01 and 15 µm, particularly up to 10 µm, and/or greater than or equal to 0.1 µm. This enables a sealing of the pores with metal to be prevented particularly well.

Advantageously, metal has been deposited until the thickness of the metal coating of the pores within the membrane or the mean thickness of the metal coating of the pores within the membrane is at least 1 nm and no more than 50 nm.

The object is also achieved through the use of a metal-coated polymer membrane having porous passageways, the metal-coated polymer membrane having an internal polymer membrane with porous passages and a metal coating, characterized in that the polymer membrane is completely encapsulated by the metal coating and the metal coating has a thickness of from 1 nm, particularly 5 nm, to 500 nm.

In particular, the coating is applied directly to the polymer membrane. In particular, the coated polymer membrane consists exclusively of the polymer membrane and the metal coating.

To special advantage, the polymer membrane with metal coating thus has a porosity that is reduced by between 1% and 50%, particularly 1% and 20% relative to the initial bubble point pore and/or the mean pore size compared to the uncoated polymer membrane.

For example, the membrane can also be folded and/or used in folded form as is known in conventional membranes. In particular, at least one insulating folding aid is used and/or included, particularly on each side of the membrane. These allow for passage of liquid and, in particular, provide for insulation of the individual folds from one another. In particular, the at least one folding aid is arranged on one or both sides of the membrane prior to folding and folded together with the membrane. The folding aids need not be made completely of insulating material; for instance, a polymer fleece can be used that is particularly coated in an electrically conductive manner on one side or both sides, but the fleece itself provides for insulation.

According to the method, in order to achieve the object of the at least temporary separation and/or detection of charged biologically active substances,
 a. a polymer membrane with a flat and porous metal coating, particularly as described above, is provided at least on a first side, particularly on both sides, of the polymer membrane;
 b. a counterelectrode is provided;
 c. a voltage is applied between the metal coating of the polymer membrane and the counterelectrode;
 d. the polymer membrane and, in particular, the counterelectrode are brought into contact with the liquid, with the contacting being performed particularly such that the liquid generates at least one connection between the polymer membrane and the counterelectrode.

By means of such a method, it is possible to adsorb and/or retain, and hence particularly to separate charged substances, particularly biologically active charged substances, as well as other charged substances at least temporarily from liquids—for example from blood—through binding to the polymer membrane with metal coating. At the same time, a much more customized and flexible process control can be achieved than is possible with known (ionically) charged membranes. Detachment into another liquid, for example—for the purpose of recovery, for example—can also be facilitated, particularly without the need to change a pH value, by reversing the voltage, which does not presuppose the same level of voltage with an reversed sign, but rather can also be of a lower or higher magnitude, and/or by decreasing the voltage.

The amount of voltage is advantageously no more than 1.5 V. In particular, the amount of voltage is no more than 1.5 V even after a polarity reversal. The voltage or the energy required to generate it can be transferred capacitively, inductively, and/or by cable, for example. In particular, the voltage or the energy required to generate it can be transferred, especially inductively, into a housing that encloses the polymer membrane and the counterelectrode. For example, the voltage or the energy required to generate it can be inductively coupled into the housing and applied to the polymer membrane and the counterelectrode within the housing via cables.

The expression "charged biologically active substances" is to be understood as referring to a variety of substances. A more or less specific retention, separation, and/or a more or less specific detection of individual or numerous substances can be made possible, for example, through targeted selection of the voltage and/or of the membrane surface. A retention and/or an adsorption against/by the membrane of more highly charged particles is already possible at lower voltages than for less-highly charged particles. This allows for a certain selectivity through selection of the voltage. It is not imperative that only a single substance be separated and/or detected. Examples of suitable biologically active substances include viruses, bacteria, endotoxins, proteins, amino acids, zwitterions, substances with an isoelectric point, exosomes, and/or vesicles. They need not have a charge in every environment in order to be regarded as charged. It is sufficient that they have a charge in a state in which they are or can be brought into contact with the membrane; in particular, they are present in the liquid at least partially in a charged state. Thus, separation and/or detection, particularly of proteins, more particularly viruses, is performed particularly in a solution having a pH at which the substances to be retained and/or adsorbed have the greatest possible charge, particularly relative to substances that are not to be retained or adsorbed.

In general, polymer membrane with metal coating and, in particular, the counterelectrode as well are extensively brought into contact with the liquid, particularly wetted over a large area. A contact or connection over a small area—by means of a drop between the counterelectrode and polymer membrane with metal coating, for example—is already sufficient, however. Contacting can also be achieved by filling one or a plurality of pores of a two-sided metallically coated polymer membrane, one side of which is used as a counterelectrode.

To special advantage, the counterelectrode is formed either by an additional flat, porous metal coating on a second side that is situated opposite the first side, the two-dimensional metal coatings being isolated from each other by the polymer membrane, or through arrangement of a permeable electrode that is formed particularly by a metallic mesh and/or a rod electrode with interposition of an insulating and permeable spacer and/or with spacing.

Advantageously, the porosity of the polymer membrane with metal coating is selected so as to be reduced by between 1% and 50%, in particular 1 and 20% relative to the initial bubble point pore and/or the mean pore size compared to the uncoated polymer membrane. This provides reliable conductivity and large porosity at the same time.

Advantageously, the polymer membrane is selected such that the thickness of the metal coating is 1 nm, particularly 5 to 50 nm, and/or the pore size of the uncoated polymer membrane is particularly greater than 0.01 µm and particularly less than 15 µm. This provides reliable conductivity and large porosity at the same time.

To special advantage, a reference electrode is provided for measurement purposes and the potential at the reference electrode is measured.

Advantageously, in addition to the polymer membrane with metal coating that is used according to the invention as an electrode and counterelectrode and, optionally, as a reference electrode, at least one additional electrode is provided, particularly at least one additional polymer membrane with a metal coating or an additional side of the polymer membrane with a metal coating, particularly as explained above, provided as an additional electrode. In particular, this additional electrode is likewise arranged in the common housing and is insulated electrically from the polymer membrane with metal coating and the counterelectrode. The common housing can also be an outer housing that encloses an inner housing in which polymer membrane and counterelectrode are arranged.

In particular, a voltage is applied to the at least one additional electrode that is selected such that the potential of the counterelectrode comes to lie between the potential of the polymer membrane with metal coating and of the at least one additional electrode. In particular, the counterelectrode is arranged in the housing between the polymer membrane with metal coating and the at least one additional electrode.

In this case, it can also be expedient to use a plurality of reference electrodes and to respectively arrange them between the electrodes and/or counterelectrode.

Electrosorption experiments were conducted on a polyethersulfone membrane with a pore size of 0.2 µm in an arrangement as shown in FIG. 1. A laboratory filtration membrane with a diameter of d=47 mm was provided for this purpose with a 15 nm layer of aluminum by means of magnetron sputtering. A copper cable was glued to the aluminum surface and provided with an insulating varnish. The remaining cable was about 30 cm long and insulated. The membrane was placed in a commercial vacuum filtration unit. The receiving vessel was filled with pure water and a platinum counterelectrode introduced therein.

Endotoxins were introduced into the pure water in the receiving vessel so that an endotoxin concentration of 1,000 IU (international units endotoxin) was achieved. Filtration was carried out without pressure. Filtration was performed with the membrane in the original state without a coating and with a membrane with a 15 nm coating. A voltage of 500 mV was applied to the coated membrane. The results are shown in the following table.

|  | Concentration of endotoxin in IE/ml | | ml Sample volume |
|---|---|---|---|
|  | feed | collecting vessel |  |
| Filter without coating | 1000 | 952.5 | 100 |
| Filter with coating at +500 mV | 1000 | 0.3 | 50 |

It can clearly be seen that endotoxins are retained, particularly adsorbed almost completely via the charged aluminum coating, so that the concentration in the collecting vessel is close to zero. Little was adsorbed not only the polymer membrane in the original state without metal coating, but also the metal-coated polymer membrane without voltage.

The adsorbed endotoxins can be released again and removed from the membrane by reversing the polarity of the voltage and rinsing the membrane.

Similar to the endotoxin retention experiment described above, virus retention can also be achieved. It is known that viruses have a negative charge above their isoelectric point and can be adsorbed on surfaces with a positive charge (Adsorption of viruses to charged modified silica, Zerda et al., Applied and Environmental Microbiology, January 1985, p. 91-. Using the same experimental setup as described above in relation to the retention of bacteria, experiments were conducted on the retention of viruses. Bacteriophages MS2 with a size (diameter) of 25 nm were used. The isoelectric point of these bacteriophages is at pH 3.9. 15 ml of an aqueous solution of $10^5$ PFU/ml (plaque-forming units/ml) were filtered through the membrane; the pH of the solution was 7. Membranes of polyethersulfone 0.2 µm without a coating and with a coating of titanium (20 nm) and a coating of gold (20 nm) were investigated. The following table shows the results of the experiments:

| Coating | Voltage in volts | Retention in Log 10 |
|---|---|---|
| without | 0.0 | 0.1 |
| Titanium | 0.0 | 0.05 |
| Titanium | 1.0 | 1.4 |
| Gold | 0.0 | <0.01 |
| Gold | 1.0 | 2.4 |

It is apparent from the results of the retention experiments—particularly for adsorption, without a coating, and without voltage—that a low level of virus retention is achieved on the membrane without a coating. Polymer membranes have a zeta potential (surface tension) without a coating. Titanium and gold have a lower zeta potential (near zero). So it is understandable that without voltage on the membrane without a coating, the most viruses are adsorbed in comparison to the coated membranes, since a gold or titanium coating of the membrane reduces the zeta potential and thus the charge of the membrane.

Considering the results of the tests for adsorption under a voltage of 1.0 volts, virus retention on the order of 1.4 $\log_{10}$ (i.e., a retention of >95%) is achieved with the titanium coating, and virus retention on the order of 2.4 $\log_{10}$ (i.e., >99% retention) is achieved with a gold coating. It was able to be shown that, by means of a membrane that is provided with a metal layer and an applied voltage of 0.5 volts or 1.0 volts, a significant improvement of the retention, particularly adsorption, of endotoxins as well as of viruses can be achieved in comparison to an uncharged membrane.

In addition, after switching the voltage in the experiments for the retention of endotoxins from +500 mV to −500 mV, at least 50% of the adsorptively bound endotoxins were able to be recovered back into the water by rinsing the membrane with water. This demonstrates that at least some of the endotoxins are desorbed by reversing the voltage.

The object is also achieved by a method for determining the occupancy of the binding sites of the polymer membrane with a flat and porous metal coating and/or for determining at least one at least relative concentration in the liquid, this method building on the method for the at least temporary separation and/or detection of charged biologically active substances in a liquid and can make use of all advantageous embodiments and is characterized in that the current flow caused by the applied voltage is detected and/or evaluated, particularly evaluated with regard to falling below a limit and/or exceeding a positive and/negative rate of change and/or its time course, and an alarm is triggered particularly in the case of an undershoot or overshoot. This enables concentration limits or rates of change of concentrations to be monitored, for example.

Such monitoring can be performed very closely and even in real time. For instance, it is possible to monitor the endotoxin concentration in the blood. The current flow is dependent on the occupancy of the binding sites on the membrane. If fewer binding sites are available, the current flow drops. The concentration need not be determined as an absolute value, however; it is also sufficient to detect under- or overshooting of reference values, and the reference values can also be indicated in the form of current flows.

For instance, an alarm can occur when certain concentration limits and/or rates of change are exceeded, particularly measured as the rate of change of the current flow, e.g., acoustically, optically, and/or electrically.

The object is achieved by electrosorption and/or electrofiltration device comprising a counterelectrode and a polymer membrane with a flat and porous metal coating on at least one side of the polymer membrane, particularly as described above, and a contact of the metal coating for the purpose of applying a voltage to the counterelectrode. The above applies here to the device as well, particularly with regard to electrode, membrane, coating, counterelectrode, reference electrode, and/or arrangement.

The polymer membrane and, in particular, the counterelectrode as well are arranged in a housing that is embodied particularly as a syringe attachment and/or has a small hold-up volume, particularly of no more than 10 ml and/or no more than 20 $mm^3/mm^2$ of metal coating on the polymer membrane, particularly no more than 2 $mm^3/mm^2$ of metal coating on the polymer membrane, and/or the polymer membrane and the counterelectrode are configured to be or are connected to a voltage source that is set up to form a voltage between the polymer membrane and the counterelectrode, the voltage source being arranged particularly in a common housing with the polymer membrane and the counterelectrode and/or a current-measuring device being provided that measures the current flowing between the polymer membrane and the counterelectrode and/or measures its rate of change and/or compares it with a limit value, and/or the voltage source being configured to reverse the polarity of the voltage.

For the purpose of connecting to a voltage source and/or contacting the metal coating, the metal coating of the membrane can, for example, be connected directly to and/or brought into contact with an electrical conductor, e.g., a cable, for example by soldering or welding. In addition or alternatively, however, it can also be brought into contact with other electrically conductive components—e.g., with a cage into which the membrane is inserted and/or with at least one conductive coated folding aid—and connected to the voltage source by means of these and, optionally, additional components and/or cables and/or contacted by same.

It is also possible to incorporate an inductive and/or capacitive coupling into the connection to the voltage source so that it is also possible, for example, to connect the voltage source through a closed housing without corresponding cable feedthroughs.

The common housing can also be an outer housing that encloses an inner housing in which polymer membrane and counterelectrode are arranged.

In particular, a residence volume for liquid is provided in the housing in which liquid can dwell or through which liquid can be moved. The flat and porous metal coating of the polymer membrane and, in particular, the counterelectrode are then arranged within this volume. This residence volume is arranged particularly in liquid-permeable connection with at least one, particularly two connections for hoses and or syringes, particularly in the form of a Luer-lock connection. In particular, this residence volume together with the volume of the at least one, particularly two connections and the liquid-permeable connection represents the hold-up volume.

The device can also include a device for generating a voltage, e.g., a battery, particularly in the common housing, that is particularly arranged and/or contacted such that it can generate a potential between metal coating of the polymer membrane and counterelectrode.

The device is embodied particularly as a pre-filter and/or syringe attachment.

In particular, counterelectrode and polymer membrane with a flat and porous metal coating are electrically insulated from one another.

Electrosorption and/or electrofiltration device particularly has a vessel and/or housing for the purpose of arranging and conducting liquid through as well, the polymer membrane and the counterelectrode being arranged so as to be electrically insulated from one another.

The electrosorption and/or electrofiltration device can include one or more reference electrodes.

It can also advantageously contain at least one additional electrode as described above in relation to the electrosorption and/or electrofiltration process.

The other features described in relation to this method can also be advantageously implemented in the electrosorption and/or electrofiltration device.

The polymer membrane with metal coating is advantageously a metal-coated polymer membrane as described above. These are especially suitable, particularly if the porous passages are also coated with metal. Since the electrically active surface is then substantially larger. However, other metal-coated polymer membranes can also be used.

To special advantage, the counterelectrode is either an additional flat, porous metal coating on a second side that is situated opposite the first side or a permeable electrode that is formed particularly by a metallic mesh with interposition of an insulating and permeable spacer.

In particular, the device for carrying out the method for the at least temporary separation and/or detection of charged biologically active substances is advantageously configured with some or all advantageous features. In particular, it is also configured to carry out the method for determining the occupancy of the binding sites of the polymer membrane with a flat and porous metal coating and/or for determining at least one concentration in the liquid. The method is carried out particularly with a device according to the invention.

BRIEF DESCRIPTION OF THE SEVERAL VIEWS OF THE DRAWINGS

Additional advantageous embodiments are to be explained below purely for the sake of example with reference to the schematic drawing that follows. In the drawing.

DETAILED DESCRIPTION

Figure 1:
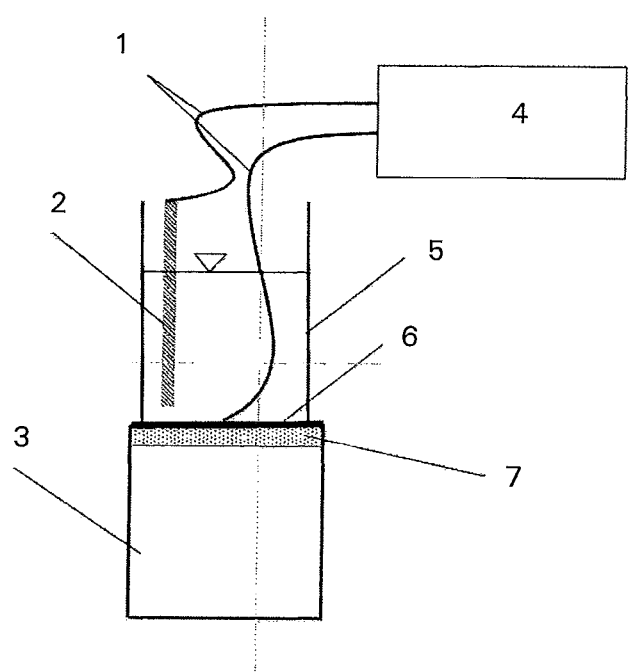
FIG. 1 shows an electrofiltration device according to the invention.

FIG. 1 shows an electrofiltration device according to the invention. The electrofiltration method according to the invention can be carried out with this.

A liquid is introduced into the receiving vessel (5) and filtered into the collecting vessel (3) through the membrane (6), which is formed by a metal-coated polymer membrane, with application of a voltage, applied by a potentiostat (4), between the membrane (6) that is embodied as an electrode, and counterelectrode (2). The frit (7) serves the purpose of stabilizing the membrane.

Figure 2:
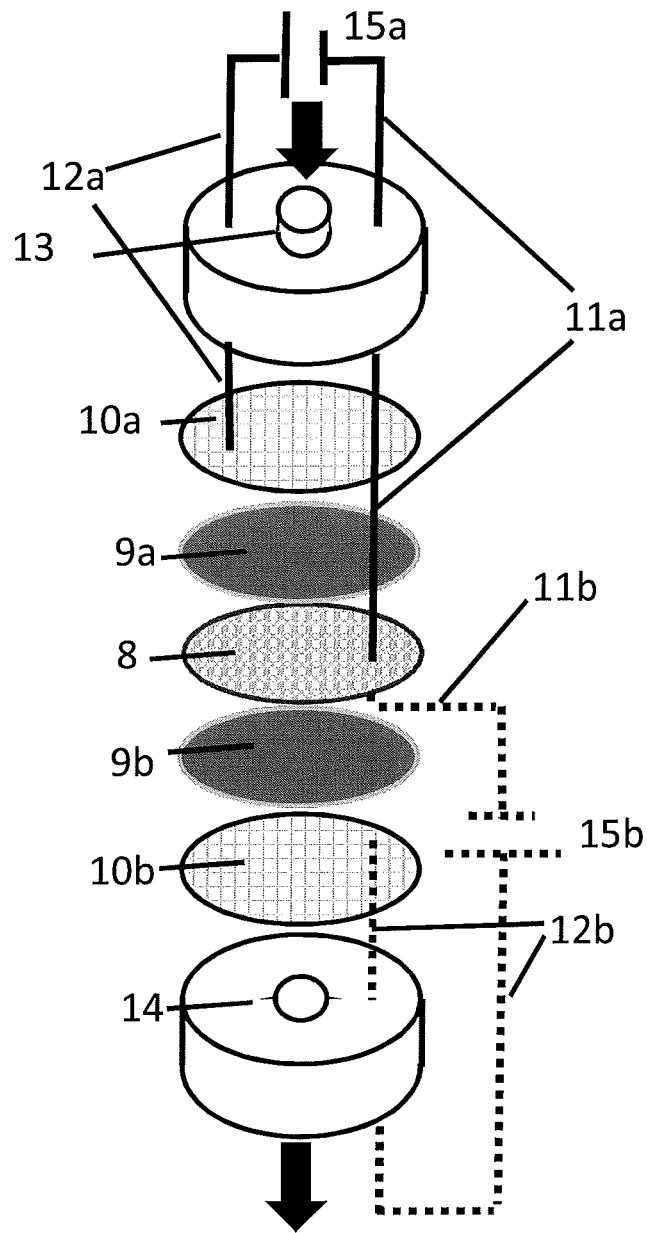
FIG. 2 shows an electrofiltration device according to the invention as a syringe attachment filter.

FIG. 2 shows an electrofiltration device according to the invention in the form of a syringe attachment filter. Shown is a circular membrane (8) made of polymer material and metallized on one or both sides. The metallization can be applied to one side, upstream from the membrane (top of the figure) or downstream from the membrane (bottom of the figure), or to both sides. In the case of application to both sides, the metallized sides are particularly insulated from one another.

In principle, FIG. 2 shows two possible embodiments in one figure. Either all parts that are designated by the suffix b are omitted, or all parts that are designated by the suffix a.

In particular, the filter also has at least one counterelectrode (10a or 10b, 12a or 12b). This can be embodied as a metal mesh, for example.

Electrically insulating but permeable release films (9a or 9b) that allow the flow of a liquid in the direction indicated by the arrows, but provide electrical insulation between the circular membrane (8) and counterelectrode (10a or 10b) can be included. However, an embodiment without such a dividing line is also possible if insulation is ensured by means of other constructive measures.

The syringe attachment filter has a filter inlet (13). It also has a filter outlet (14). These can include feedthroughs for contacting. These can be achieved by cable but also inductively, capacitively, by means of plugs, and/or the like.

Electrical conductors (12a or 12b and 11a or 11b) are also included. The conductors (12a or 12b) themselves can also serve as counterelectrodes and thus replace the counterelectrodes (10a or 10b).

Filter inlet and filter outlet are particularly part of a housing for the hermetic sealing of the entire filter, so that a loss of liquid is only possible between the filter inlet and filter outlet and only by passing through the elements that are arranged in the liquid flow, such as circular membrane, trend film, and counterelectrode, insofar as they are embodied as a permeable or mesh.

The syringe attachment filter is embodied so as to enable a potential to be applied between metallization of the circular membrane and counterelectrode. For this purpose, it particularly has corresponding conductors, feedthroughs, and/or contacting and/or transmission devices (in particular inductive and/or capacitive). The voltage can be applied, for example, via a voltage source (15a or 15b) and electrical conductors (12a or 12b and 11a or 11b).

With the aid of such a syringe attachment filter with a voltage source (15a or 15b), substances contained in the liquid, such as endotoxins, can be adsorbed on the circular membrane (8) under a first polarization of the voltage source when liquid, particularly blood, is passed through the syringe attachment filter.

Later, the substances can be discharged, particularly under reverse polarization or without voltage and with the passage of another liquid, e.g., water, particularly counter to the direction of flow shown by the arrows.

Figure 3:
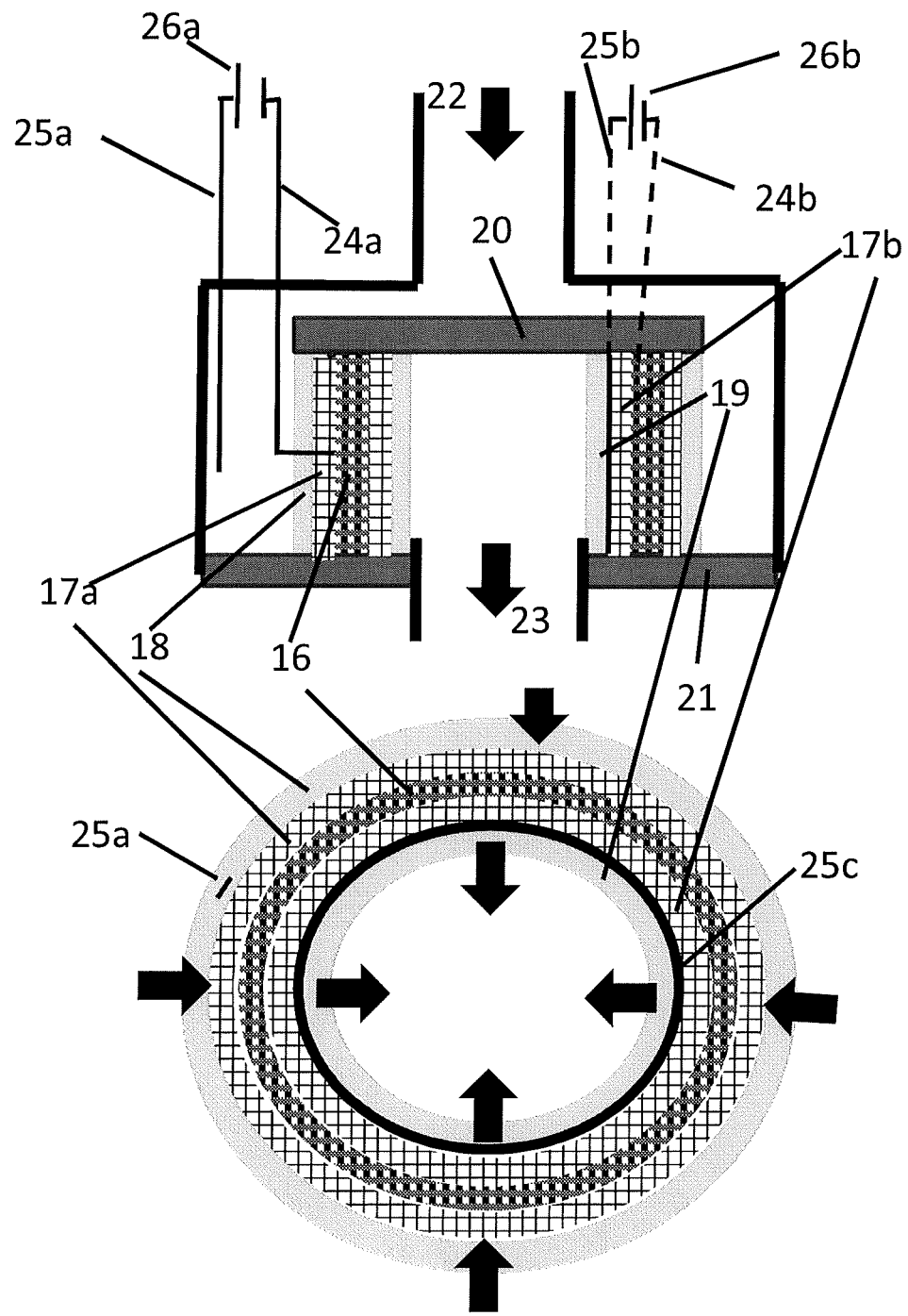
FIG. 3 an electrofiltration device according to the invention with a folded membrane that is embodied as a cartridge in a housing.

FIG. 3 shows a cartridge according to the invention in a housing with a folded membrane (16). According to the prior art, such fluted filter cartridges are prepared as follows:
1. The membrane (16) is positioned and folded between two folding aids (17a and 17b), which are particularly made of a polymer fleece and/or film.
2. The finished folded membrane is pressed into a round cage (18) so that it does come unfolded again and is provided with a core. Cage and core are particularly made of plastic and, in particular, configured such that liquid can pass through, particularly provided with rectangular or round holes.
3. The membrane with folding aid and cage and core are welded to the upper closure of a sealed plastic cap and then welded to the lower closure (plate with opening).

The same procedure was also used in this exemplary embodiment and can generally be used with the membrane that is included and/or used according to the invention.

FIG. 3 shows a circular membrane (16) made of polymer material and metallized on one or both sides. The metallization can be applied to one side, upstream from the membrane (on the outside in the figure) or downstream from the membrane (on the inside in the figure), or to both sides. If it is applied to both sides, the metallized sides are particularly insulated from one another by the membrane itself. The membrane is folded particularly by means of folding aids that are folded with the membrane and consist particularly of a polymer fleece (17a, b). The polymer fleece can be embodied both as a conductive fleece (with metal coating on both sides) or as a voltage-insulating fleece.

In principle, FIG. 3 shows two possible embodiments in one figure. Either all parts that are designated by the suffix b are omitted, or all parts that are designated by the suffix a. In the variant in which the parts that are denoted with the suffix a are included, the membrane is contacted directly via an electrical line as an electrode, or in the variant in which the parts that are denoted with the suffix b are included, the membrane is contacted as an electrode via an electrically conductive folding aid (17b) and via an electrically conductive core that holds the folded membrane.

In particular, the filter also has at least one counterelectrode (25a or 25b). This can be embodied as a metal mesh and/or rod electrode, for example.

The filter that is embodied as a cartridge with folded membrane has a filter inlet. It also has a filter outlet (23). These can include feedthroughs for contacting. These can be achieved by cable but also inductively, capacitively, by means of plugs, and/or the like.

Electrical conductors (24a and 25a or 24b and 25b) are also included. The conductors (25a or 25b) can serve as counterelectrodes and thus replace the counterelectrodes.

Filter inlet and filter outlet are particularly part of a housing for the hermetic sealing of the entire diaphragm so that a loss of liquid is only possible between the filter inlet and filter outlet and only by passing through the elements that are arranged in the liquid flow, such as membrane and counterelectrode, insofar as they are embodied as a permeable or mesh.

The cartridge with folded membrane is embodied so as to enable a potential to be applied between metallization of the membrane and counterelectrode. For this purpose, it particularly has corresponding conductors, feedthroughs, and/or contacting and/or transmission devices (in particular inductive and/or capacitive). The voltage can be applied, for example, via a voltage source (26a or 26b) and electrical conductors (25a or 25b and 24a or 24b).

With the aid of such a cartridge with folded membrane with a voltage source (26a or 26b), substances contained in the liquid can be adsorbed on the folded membrane (8), for example under an initial polarization of the voltage source upon passage of liquid through the cartridge with folded membrane.

Later, the substances that were previously bound electrosorptively to the folded membrane of the filter can be desorbed, particularly under reverse polarization or without voltage and, in particular, with the passage of another liquid, e.g., water, particularly counter to the direction of flow indicated by the arrows.

LIST OF REFERENCE SYMBOLS 1 cable
2 counterelectrode 3 collecting vessel
4 potentiostat
5 receiving vessel
6 diaphragm
7 frit
8 circular membrane (polymer) with metallization on one side (upstream or downstream) or on both sides
9a and b electrically insulating, permeable release film
10 a and b counterelectrode upstream (a) and downstream (b) from the switchable circular membrane 1 in the form of a permeable metal mesh
11a metal wire for contacting of the upstream-side metallization of the circular membrane 8
  b metal wire for contacting of the downstream-side metallization of the circular membrane 8
12a and b electrical conductor to the counterelectrode/metal mesh 10a and 10b
13 filter inlet with feedthrough(s) for electrical contacting of electrode/membrane and counterelectrode
14 filter outlet, optionally with feedthrough for electrical contacting of the counterelectrode/metal mesh
15a voltage source for applying electrical potential to electrode and counterelectrode
  b voltage source for applying electrical potential to electrode and counterelectrode
16 folded membrane
17a and b electrically insulating, permeable release film in front of or behind the membrane
18 conductive outer sleeve of the cartridge
19 conductive inner sleeve of the cartridge
20 upper closure member and baffle plate of the cartridge
21 lower closure member and outlet of the cartridge
22 filter inlet and filter housing
23 filter outlet and filter housing
24a contact bushing for electrical contacting of the upstream metallization of the membrane 16
  b contact bushing for electrical contacting of the downstream metallization of the membrane 16
25a contact bushing and counterelectrode on the upstream side of the metallized membrane 16
  b contact bushing for electrical contacting of the counterelectrode
  c counterelectrode on the downstream side of the metallized membrane 16
26a voltage source for applying electrical potential to electrode and counterelectrode
  b voltage source for applying electrical potential to electrode and counterelectrode

The invention claimed is:

1. A method for the at least temporary separation and/or detection of charged biologically active substances in a liquid by means of electrosorption and/or electrofiltration, comprising the following steps:
  a. providing a polymer membrane with a flat and porous metal coating at least on a first side of the polymer membrane;
  b. providing a counterelectrode;
  c. applying a voltage between the metal coating of the polymer membrane and the counterelectrode;
  d. bringing the polymer membrane and the counterelectrode into contact with the liquid, with the contacting being performed such that the liquid generates at least one connection between the polymer membrane and the counterelectrode; and
  e. after steps a to d, reversing polarity or reducing the voltage, and rinsing the membrane.

2. The method as set forth in claim 1, wherein step c takes place after steps a and b and before step d, or wherein step d takes place after steps a and b and before step c.

3. The method as set forth in claim 1, wherein, after steps a to d, the liquid is removed at least partially and/or the liquid is allowed to pass through the membrane at least partially.

4. The method as set forth in claim 1, wherein, the rinsing of the membrane is performed before or after the polarity reversal or reduction in the voltage.

5. The method as set forth in claim 1, wherein the polymer membrane with a flat and porous metal coating and the counterelectrode are accommodated in a housing, which has a small hold-up volume of no more than 10 ml and the liquid to be filtered is conducted through the housing.

6. The method as set forth in claim 5, wherein the housing has a small hold-up volume of no more than 10 ml and no more than 2 mm$^3$/mm$^2$ of metal coating on the polymer membrane.

7. The method as set forth in claim 5 wherein the liquid is pressed out of a syringe and through the housing through actuation of the syringe.

8. The method as set forth in claim 1, wherein the counterelectrode is formed either by an additional flat, porous metal coating on a second side that is situated opposite the first side, the two-dimensional metal coatings being isolated from each other by the polymer membrane, or through arrangement of a permeable electrode.

9. The method as set forth in claim 8, wherein the permeable electrode is formed by a metallic mesh with interposition of an insulating and permeable spacer.

10. The method as set forth in claim 1, wherein the porosity of the polymer membrane with metal coating is reduced by between 1% and 50% relative to the initial bubble point pore and/or the mean pore size compared to the uncoated polymer membrane.

11. The method as set forth in claim 10, wherein the porosity of the polymer membrane with metal coating is reduced by between 1% and 20% relative to the initial bubble point pore and/or the mean pore size compared to the uncoated polymer membrane.

12. The method as set forth in claim 1, wherein the thickness of the metal coating is from 5 to 50 nm and the pore size of the uncoated polymer membrane is greater than 0.01 µm.

13. The method as set forth in claim 1 for determining the occupancy of the binding sites of the polymer membrane with a flat and porous metal coating or for determining at least one concentration in the liquid, wherein the current flow caused by the applied voltage is detected or evaluated, and an alarm is triggered in the case of an undershoot or an overshoot.

14. The method as set forth in claim 13, wherein the current flow caused by the applied voltage is evaluated with regard to falling below a limit or exceeding a positive or negative rate of change.

15. The method as set forth in claim 1, wherein there is no more than 20 mm$^3$/mm$^2$ of metal coating on the polymer membrane.

16. A method for the at least temporary separation and/or detection of charged biologically active substances in a liquid by means of electrosorption and/or electrofiltration, comprising the following steps:
  a. providing a polymer membrane with a flat and porous metal coating at least on a first side of the polymer membrane;
  b. providing a counterelectrode;

c. applying a voltage between the metal coating of the polymer membrane and the counterelectrode;

d. bringing the polymer membrane and the counterelectrode into contact with the liquid, with the contacting being performed such that the liquid generates at least one connection between the polymer membrane and the counterelectrode;

wherein the liquid is pressed out of a syringe against the polymer membrane with a flat and porous metal coating or through the polymer membrane with a flat and porous metal coating through actuation of the syringe.

17. An electrosorption and/or electrofiltration device, comprising at least one polymer membrane with a flat and porous metal coating on at least one side of the polymer membrane and a contact of the metal coating and a counterelectrode, wherein the polymer membrane and the counterelectrode are arranged in a housing that has a small hold-up volume or no more than 20 mm³/mm² of metal coating on the polymer membrane, or wherein the polymer membrane and the counterelectrode are connected to a voltage source that is configured to form a voltage between polymer membrane and counterelectrode, wherein the voltage source with the polymer membrane and the counterelectrode are arranged in a common housing, or a current-measuring device is provided that measures the current flowing between polymer membrane and counterelectrode or the rate of change thereof or compares it with a limit value, or the voltage source is configured to reverse or reduce the polarity of the voltage.

18. The electrosorption and/or electrofiltration device as set forth in claim 17, wherein the counterelectrode is either formed by an additional flat, porous metal coating on a second side that is situated opposite the first side or by a permeable electrode.

19. The electrosorption and/or electrofiltration device as set forth in claim 18, wherein the permeable electrode is formed by a metallic mesh with interposition of an insulating and permeable spacer.

20. The electrosorption and/or electrofiltration device as set forth in claim 17, wherein the porosity of the polymer membrane with metal coating is reduced by between 1% and 50%, relative to the initial bubble point pore and/or the mean pore size compared to the uncoated polymer membrane.

21. The electrosorption and/or electrofiltration device as set forth in claim 20, wherein the porosity of the polymer membrane with metal coating is reduced by between 1% and 20% relative to the initial bubble point pore and/or the mean pore size compared to the uncoated polymer membrane.

22. The electrosorption and/or electrofiltration device as set forth in claim 17, wherein the thickness of the metal coating is from 5 to 50 nm and the pore size of the uncoated polymer membrane is from 0.01 µm to 15 µm.

23. The electrosorption and/or electrofiltration device as set forth in claim 17, wherein the polymer membrane and the counterelectrode are arranged in a housing that has a small hold-up volume of no more than 10 ml and no more than 2 mm³/mm² of metal coating on the polymer membrane.

24. The electrosorption and/or electrofiltration device as set forth in claim 17, wherein the housing is a syringe attachment.

25. The electrosorption and/or electrofiltration device as set forth in claim 17, wherein the small hold-up volume is no more than 10 ml.

* * * * *